July 2, 1929.  O. M. KREMBS  1,719,512
DIP BRAZING
Filed Nov. 8, 1926

Witness:
R. Burkhardt

Inventor:
Othmar M. Krembs,
by Cromwell, ...
Attys.

Patented July 2, 1929.

1,719,512

UNITED STATES PATENT OFFICE.

OTTMAR M. KREMBS, OF CHICAGO, ILLINOIS.

DIP BRAZING.

Application filed November 8, 1926, Serial No. 146,969.

This invention relates to a process of dip brazing or soldering. It possesses particular utility and advantages in the brazing together of portions of metal by the use of hard solder, for example, a copper and zinc spelter, but is applicable in either hard or soft soldering.

The general object of the invention is the provision of a procedure to be followed in dip brazing, which will be more economical than methods heretofore employed and which will produce strong joints.

Another object is the provision of a process which will reduce the possibility of injury to the metal portions which are subjected to the operation, particularly in respect to changing their condition of temper.

Stated with more particularity, the objects of the invention include the provision of a process which will permit a saving of heat and fuel in dip brazing operations in the manufacture of various articles.

Another object is the reduction of destructive effects on the crucibles employed for containing the brazing bath.

Another object is the retarding or decreasing of the oxidation or burning out of the zinc from the spelter by the heat.

Another object is the avoidance of the coating or adhesion of spelter on portions of the brazed articles other than where it is desired, thereby reducing waste of the spelter and obviating the necessity for removal of the undesired coatings or adhesions.

Another object is the reduction of the time requisite for brazing articles.

Another object is the reduction of the amount of flux material required for brazing articles, particularly in quantity manufacture.

A further object is the provision of a process whereby the temperature of the brazing bath may be determined continuously and controlled accurately.

Other and further objects will be pointed out or indicated hereinafter or will appear to one skilled in the art upon an undertsanding or practice of the invention.

For the purpose of the present application, I disclose one procedure, and illustrate the same by reference to certain apparatus and articles, but these examples are presented simply for purpose of illustration and are not to be construed as limiting the claims short of the true and most comprehensive scope of the invention in the art.

Figure 1:
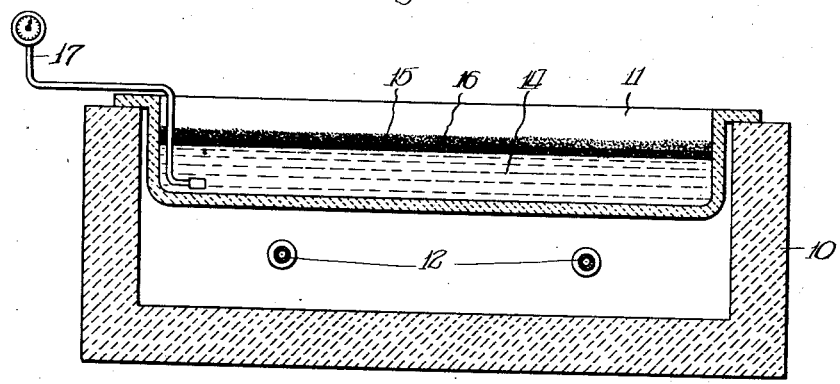
Fig. 1 is a diagrammatic representation of a brazing furnace, in the nature of a sectional elevation;

Described generally, a procedure contemplated in the practice of my invention includes the utilization of a molten bath, such as of spelter or solder, which is covered with a stratum of granular or comminuted material which is a highly effective heat insulator and of lower specific gravity than the bath, and infusible by the heat of the bath and incombustible in air at the temperature at which the brazing is done, and inert with respect to the material of the bath. Articles to be brazed are prepared for immersion in this bath by coating the portions to which it is desired the brazing material adhere with a suitable flux. The articles so prepared are immersed in the bath through the insulating stratum, resulting in the adhesion of the brazing material to the portions prepared with the flux. As a part of the stratum I may employ a material of a suitable nature to deposit on the surface of the article, as it is passed through the stratum, a coating or application which will be effective to prevent the adherence of the spelter to the portions which have not been treated with the flux.

For further and more detailed understanding of the invention, I will describe one particular example, reference being had to the accompanying drawing. Let it be understood that in the drawing, the reference character 10 designates a furnace in which is a crucible 11 which is heated by gas flame from burners 12. The crucible contains the spelter bath 14 of a suitable brazing combination, such as of copper and zinc, which is maintained in a molten state by the heat of the furnace. The bath is covered with a stratum of granular or comminuted material having good heat insulating properties and which is of less specific gravity than the bath and is inert with respect to the bath material and incombustible and infusible at the brazing temperature of the bath. I prefer to use for this heat insulating covering a stratum 16 of comminuted micacious material, such as the material known as dehydrated biotitic mica and sometimes called zonolite. This micacious material forms a particularly effective heat confining or heat insulating covering for the bath, and may be used alone or over a lower stratum 15 of talc, which provides an arrangement for applying to the surface of an article passed therethrough a coating or application to prevent adhesion of the spelter. The comminuted material may be of various sizes, depending on the particular work in hand. The comminuted micacious material may be used in a granular or foliated form, while the talc may vary between powdered and coarse granular sizes. The comminuted material may be employed in varying depths. I have found that a depth of from one-half to one inch of the micacious material, and a lesser depth of the talc, to be quite convenient.

Figure 2:
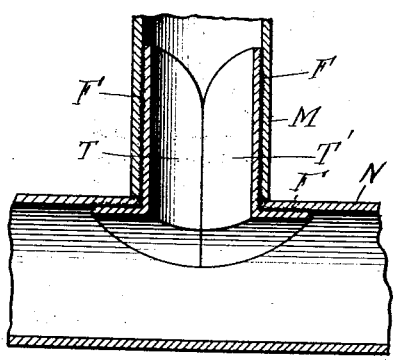
Fig. 2 is a sectional detail illustrating a joint of portions of tubing prepared for brazing by my method.
Figure 3:
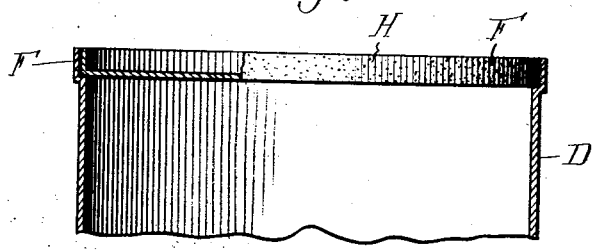
Fig. 3 a sectional elevation of a metallic drum portion with the head assembled therein and prepared for brazing in accordance with my method.

The articles to be brazed are prepared by coating the portions to which it is desired the brazing material adhere, with a suitable flux in liquid or paste form, after which the coating is dried, either before or after assembly of the portions together. It is desirable to use a highly concentrated flux. A suitable flux for practically all uses is that sold under the trade-name of "Fluxine". In Fig. 2 I show two tubular sections M and N, which may represent portions of a bicycle frame tubing, assembled with a split thimble member composed of the sections T and T'. To the surfaces upon which the braze is to be made is applied a flux coating F, before the parts are fitted together. After the parts have been so prepared, dried and assembled, the joint is immersed in the bath 14, being plunged through the covering of comminuted material. It is desirable that the metal members be subjected to a moderate preheating before being dipped. After a suitable period of immersion in the bath, which may be of comparatively short duration as compared with the present practice, the members are withdrawn from the bath through the stratum of comminuted material. After withdrawal, any of the spelter material still remaining adhering to the uncoated portions may be immediately wiped or brushed off, as by a rotary brush operated in close proximity to the furnace. In the dipping procedure, the comminuted material readily accommodates the passage of the article into the underlying bath, and prevents exposure of the surface of the bath to the air. In the passage of the article through the stratum 15 of coating material, it receives a surface application of the material, which surface application effectively prevents the adherence of the spelter to the metal. The portions coated with the flux, however, are not thus affected as the flux itself protects the surface portions to which it is applied. Consequently, the brazing is formed only on the prepared areas and adhesion of spelter to other surface portions prevented. In Fig. 3 is shown the end portion of a metal drum or cask D with which is assembled the head portion H, which is to be brazed in place, the portions upon which the braze is to be made having been coated with the flux coating F. Such of the comminuted material as may be carried down into the bath when the article is inserted, immediately floats to the surface again when the article is withdrawn, due to its lesser specific gravity.

Among the more important advantages attained by this procedure may be mentioned the following. The surface covering of dehydrated biotitic mica forms an insulating cover for the bath which holds the heat in the bath. Hence it is not necessary to burn so much fuel to keep the bath continuously at the proper temperature. This insulating covering retards the burning out or volatilization of the zinc from the bath, thus effecting a substantial saving of spelter. It also obviates the necessity for putting the flux into the bath, which, in turn, eliminates the destructive action of the flux on the crucible and the frequent replacements necessitated thereby and also reduces the possibility of the loss of an entire bath due to a sudden failure of the crucible from the rapid corrosive action of the flux thereon. Due to the fact that there is no necessity of carrying the flux in the bath, the term of life and utility of the crucible is greatly increased. Eliminating the flux from the bath also permits the use of a pyrometer in the bath, as indicated at 17 in Fig. 1, whereby the temperature of the bath may be kept continually under observation and given proper regulation, thus permitting the bath to be kept continuously at the most advantageous temperature to hold the respective components thereof at the proper proportions. The period of immerson may be substantially reduced below that generally employed in present practice, as there is no necessity for waiting for the flux to penetrate into the joints to be brazed. For that reason also, uniformity of the braze, particularly in close joints, is attained with certainty. A great saving in both material and labor is effected due to the fact that the areas to which the brazing material will adhere may be definitely controlled, thus obviating the coating of portions with spelter and flux where it is not desired, and the consequent costly and troublesome procedures involved in their removal from such portions, and avoiding the possibility of injury or defacement of the article incident to such removal of the coatings. The relatively short period of immersion requisite is a safeguard against injury to the article, such as the changing of the temper of the portions immersed in the bath, or burning or distortion by heat thus eliminating the necessity for subsequent re-shaping, retempering or annealing treatments. The shortening of the immersion period furthermore permits a very material increase in the daily output of a furnace or a workman.

In the event the material of the surface strata becomes more or less impregnated with the zinc oxide from the spelter, it should be skimmed off and replaced with fresh, which, due to the cheapness of the material, involves but small cost.

What I claim is:

1. In the art of dip brazing, a process which comprises maintaining a flux-free spelter bath in a molten state under a supernatant stratum of comminuted micacious material.

2. In the art of dip brazing, a process which comprises maintaining a flux-free bath of brazing metal in a molten condition under a supernatant stratum of comminuted dehydrated biotitic mica.

3. In the art of dip brazing, a process which comprises maintaining a bath of flux-free brazing metal in a molten condition by application of heat, floating a heat-confining covering of comminuted dehydrated biotitic mica on the surface of the bath and introducing the article to be brazed into the bath through said covering.

4. In the art of dip brazing, a process which comprises maintaining a flux-free bath of brazing metal in a molten condition under a supernatant covering of comminuted dehydrated biotitic mica, applying a flux to a surface portion of the article to be brazed, inserting the flux coated portion of the article into the bath through said covering, and withdrawing the article from the bath through said covering.

5. In brazing, a molten bath of brazing metal free of flux and a stratum of comminuted dehydrated biotitic mica floating on the bath and covering the surface of the same.

6. In brazing, a heat-insulating cover for a molten brazing bath comprising a stratum of comminuted dehydrated biotitic mica.

7. In brazing, the combination with a flux-free brazing bath of molten metal, of a stratum of comminuted micacious material floating on the bath and forming a heat-insulating cover for the same.

In testimony whereof I have hereunto subscribed my name.

OTTMAR M. KREMBS.